June 19, 1928.
E. A. WETZEL
GLASS RUNWAY CONSTRUCTION FOR WINDOWS
Filed Dec. 27, 1923
1,674,382
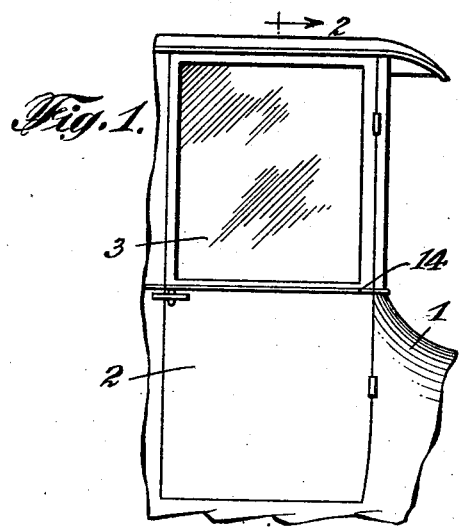
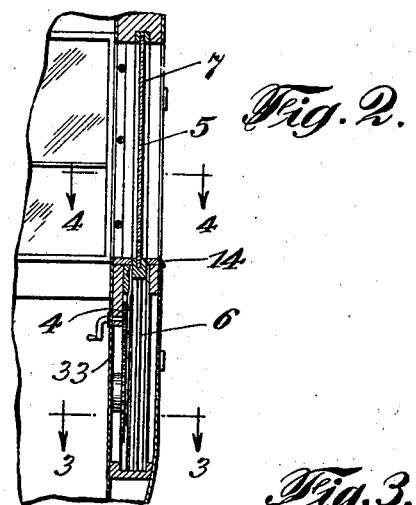
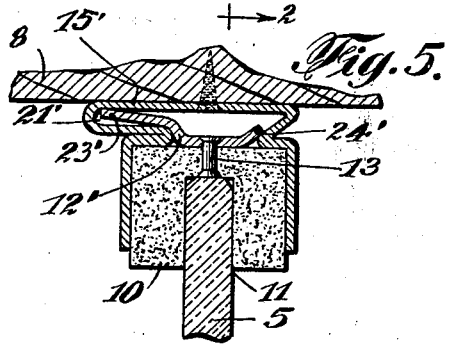
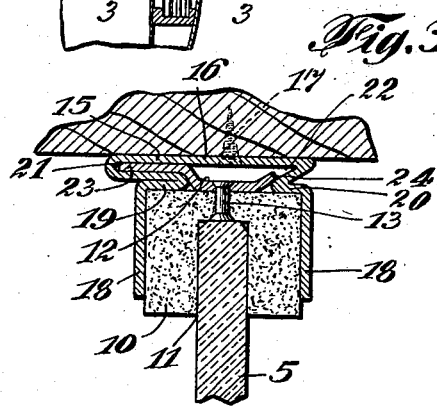
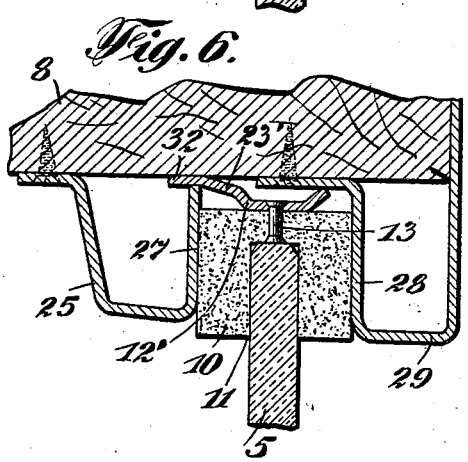
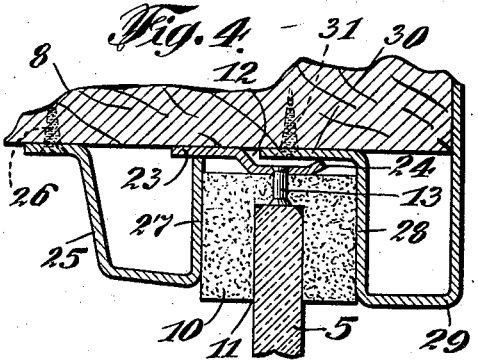
INVENTOR
Edward A. Wetzel
BY
ATTORNEY Patented June 19, 1928.

1,674,382

UNITED STATES PATENT OFFICE.

EDWARD A. WETZEL, OF ROYAL OAK, MICHIGAN, ASSIGNOR TO THE AMERICAN MOTOR BODY CORPORATION, OF PHILADELPHIA, PENNSYLVANIA, A CORPORATION OF DELAWARE.

GLASS-RUNWAY CONSTRUCTION FOR WINDOWS.

Application filed December 27, 1923. Serial No. 682,899.

This invention relates to glass runway construction for windows, and more particularly to a glass runway construction for the sashless windows of automobile bodies or automobile doors.

Window constructions now in vogue for automobile bodies require that the window glass and the runway therefor, which is usually felt or similar material, be installed before the trimming is applied and consequently before the final coat of finishing varnish, which is put on after the trimming has been applied. This varnish is apt to gum up and dirty the runway and glass, necessitating the subsequent cleaning of these parts. Moreover, these constructions do not permit replacement of a runway without removing the trimming material or other parts of the body or door construction at the well portion. Usually the runways are mounted rigidly in place and are not adapted to compensate for variations in the dimensions of the window glass, with the result that an oversize glass is apt to be held too tightly and an undersize glass is apt to be held too loosely.

The principal object of my invention is to avoid the above objectionable features and difficulties. More particularly, the objects of my invention include the provision of glass runway construction for windows having wells, which permits of the application of trimming and the final painting and varnishing of the automobile body or door before installation of the runways and glass, and permitting installation in such a way as to leave a clean and finished installation without requiring supplementary cleaning of the window glass or runway felt, and a construction which permits of the ready and easy replacement of the runway felt without requiring trimming material or other elements to be removed from the parts adjacent the well of the window. A further object of my invention is to provide a glass runway construction comprising felt, or similar material, so incorporated that the felt will not bind or bunch or pull out of place, and a construction which will enhance the smooth and easy manipulation of the window. A further object of my invention is to provide a glass runway construction for windows which is self-compensating for variations in the dimensions of the window glass. Other objects of my invention will be in part obvious and in part pointed out hereinafter.

In accordance with my invention, I provide for use in windows such as are customarily found in automobile bodies and doors and wherein the window is adapted to be lowered into a closed well, channeled runway strips, preferably of resilient material, such as felt or rubber, having metallic attachment strips secured along their rear sides, preferably coextensive therewith. Below the glass line or belt rail each runway strip is adapted to slidably seat in a channeled retaining member which is secured to a post or pillar, with the runway attachment strips slidably interlocking with the retaining member, whereby the runway is removably associated therewith. Above the glass line or belt rail the runway is adapted to be confined between flanges of the inner garnish or finishing mouldings and outside panel, and the runway attachment strip is adapted to interlock with one of these mouldings to hold the runway in place. The attachment strip is adapted to yield in the plane of the window to compensate for variations in the sizes of window glass.

In order that a clearer understanding of my invention may be had, attention is hereby directed to the accompanying drawings forming a part of this application and illustrating certain possible embodiments of my invention. Referring to the drawings, Fig. 1 is a side view of a fragment of an automobile body having a door with a window therein; Fig. 2 is a sectional view of the same and is taken on the line 2—2 of Fig. 1; Fig. 3 is a horizontal sectional view through one edge of the door and is taken on the line 3—3 of Fig. 2; Fig. 4 is a similar view but is taken on the line 4—4 of Fig. 2; Fig. 5 is a horizontal sectional view through an edge of a door below the glass line or belt rail, showing a modified glass runway construction; and Fig. 6 is a view similar to Fig. 5 but shows the modified construction above the glass line or belt rail. Similar reference characters refer to similar parts throughout the several views of the drawings.

Referring to the drawings, there is shown an automobile body 1 having a door 2 provided with a window 3, equipped with suitable mechanism 4 for lowering the widow glass 5 into the well 6 and for raising the window glass across the window opening 7. Along each side of the window and well is a post 8, which may be either wooden or metallic. Along each side of the window is a runway strip 10, preferably composed of yielding material, such as felt, rubber, or the like, each strip having a channel groove 11 in which an edge of the window pane 5 is slidably seated. Along the rear of each runway strip 10 I preferably secure a resilient, metallic attachment strip 12, as by means of split rivets 13. Means are provided for detachably securing and retaining the runways 12 in proper position along the sides of the window and well both above and below the glass line or belt rail 14. To this end I secure a retaining member 15 to each post 8, the members 15, however, preferably extending only to the glass line or belt rail. Each member 15 is channel shaped, having its base 16 secured to a post 8 by means of screws 17, or the like, and having the outer portions 18 of its spaced side walls extending parallel with the well opening and adapted to slidably receive a runway strip 10 between them. At the inner ends of wall portions 18 the retaining pieces 15 are shaped to present inwardly extending shoulder portions 19 and 20 which seat behind the runway members 10, and then to extend to the outer edges of the base 16 in such a way as to form interior grooves 21 and 22 along opposite sides of the member 15. The edge portions of the attachment strip 12 are bent away and offset from the runway strip 10 so as to permit the seating of the rear edge portions of the runway strip 10 against the shoulders 19 and 20. One edge portion 23 of each attachment strip 12 is adapted to slidably interlock behind a shoulder 19 and in a groove 21, and the opposite edge portion 24 of each attachment strip is adapted to slidably interlock behind a shoulder 20 and in a groove 22. The runway strip 10 is thus held from pulling away from the pillar or post and against movement transverse of the plane of the well, but is slidable vertically in the plane of the window, thus permitting easy and quick removal and replacement of the runways in these retaining members.

The runway members 10 and their attachment strips 12 preferably extend the full run of the window glass. Above the belt rail 14, and for the entire height of the glass, on each side of the window, the metal strip 12 is held from pulling away from the post or pillar 8 by the inside garnish or finishing moulding 25 which is fastened to a post 8 in any suitable manner, as by means of screws 26. The moulding portion 25 has a flange 27 parallel with the plane of the window opening beneath which the edge 23 of the member 12 is adapted to slidably extend. The outer portion of flange 27 constitutes a retaining flange for the felt channel member 10 along one side. A flange 28 of the outside panel 29 constitutes a retaining flange against the opposite side of the member 10. Beyond the flange 28 the panel 29 is preferably provided with a flange 30 which fits against a post 8 and beneath the edge 24 of a strip 12. Flange 30 may be secured to the post 8 by means of screws 31 or the like.

As shown in Figs. 5 and 6, instead of constructing member 12 so that the edge portion 23 thereof will be positioned parallel with and closely against the base 16 of the retaining member, the groove 21 of member 15 may be widened, as shown at 21' in Fig. 5, and a portion 23' of member 12' may be inclined with respect to the base 16'. Also the edge portion 24' of such member 12' may be arranged to be spaced from the base 16' of the retaining channel. Above the belt rail 14, however, the outer edge portion of member 12' may be made parallel with the surface of post 8, as at 32, to establish a satisfactory slidable seating of the edge of member 12' beneath the inner wall 27 of the moulding piece 25.

In installing a glass runway of the constructions described, the channel retaining members 15 or 15' may be first completely painted, varnished, and finished before attachment to the posts. The retaining strips 12 or 12' may also be completely painted, varnished and finished before being attached to the runway strips 10. The runways may be applied below the glass line or belt rail by merely sliding the tongues on each side of the attachment strips into the grooves provided therefor in the retaining channel members. The inside garnish or finish mouldings 25 and outside panel 29 may then be applied, or, if desired, one or both of these members may have been applied previously, in which case, however, in applying the attachment strips, their edges 23 or 23' are inserted beneath the end of the inside moulding strip 25. The window glass 5 is inserted in the channel 11 provided therefor in the runway strips 10, and, if necessary or desired, the attachments are made to the window regulating mechanism 4. It will be obvious that the felt runway channel members may be removed and replaced without requiring the removal of trimming material 33 from the door and without mutilating any portion thereof. The body or door may be trimmed and finally painted and varnished after the retaining members 15 or 15' have been installed but before the runways or the window have been applied. This permits of a clean and finished installation which does not require the cleaning of the glass or felt subsequent to the installation. The glass retaining felt or similar material in these constructions is reenforced and stiffened along the entire length and is so held that it will not bind or bunch or pull away from the body pillar or door post or become displaced in other ways, even when wet, thus enhancing the easy and smooth operation of the window regulator mechanism, and incidentally increasing its life by eliminating resistance occasioned by the binding or bunching or displacement of the felt. It is also to be noted that the yielding and resilient manner of mounting the runway strips in place renders the construction self-compensating to variations in the size of the window pane.

As many changes could be made in the above construction and as many apparently widely different embodiments of this invention could be made without departing from the scope thereof, it is intended that all matter contained in the above description or shown in the accompanying drawings shall be interpreted as illustrative and not in a limiting sense.

What I claim is:—

1. In window construction, the combination with a side frame member of a retaining member secured to said frame member, a runway member for window glass, and an attachment strip secured to said runway member and slidably interlocking with said retaining member, whereby said runway member is detachably retained along a side of the window, said retaining member having vertical interior grooves and the edges of said attachment strip being offset from the runway and being slidably disposed in said grooves.

2. In window construction, in combination, a runway member, and a strip of resilient metal secured along a line intermediate its side edges to the rear of the runway member, the side edges of said strip being offset rearwardly from said runway member, said strip constituting a resilient backing and attachment means for said runway member.

3. In window construction, the combination with a side frame member, of a retaining member secured to said frame member, a runway member for window glass, and an attachment strip secured to said runway member and having an edge portion offset from the runway member and slidably interlocking with said retaining member, whereby said runway member is detachably retained along a side of the window, said retaining member having walls extending in planes parallel with the plane of the window and seated against opposite sides of said runway member.

4. In window construction, the combination with a side frame member, of a retaining member secured to said frame member, a runway member for window glass, and an attachment strip secured to said runway member and having an edge portion offset from the runway member and slidably interlocking with said retaining member, whereby said runway member is detachably retained along a side of the window, said retaining member having walls extending in planes parallel with and adjacent to the plane of the window and seated against opposite sides of said runway member and having shoulder portions seated behind said runway member.

5. In a window, including a window opening and a well beneath the opening, and a window frame upright along said opening and well, a runway member for window glass, an attachment strip secured to the runway member and having an edge portion offset rearwardly therefrom, and retainers secured to said upright adjacent the window opening and well overlapping and engaging said offset edge of the attachment strip, whereby the runway member is held to said upright.

6. In a window, including a window opening and a well beneath the opening, and a window frame upright along said opening and well, a runway member for window glass, an attachment strip secured to the runway member and having its opposite edge portions offset rearwardly therefrom, retainers secured to said upright adjacent the well and overlapping both of said offset edges of the the attachment strip, a retainer secured to said upright adjacent the window opening overlapping one of the offset edges of the attachment strip, whereby the runway member is held to said upright.

7. In a window, including a window opening and a well beneath the opening, and a window frame upright along said opening and well, a runway member for window glass, an attachment strip secured to the runway member and having its opposite edge portions offset rearwardly therefrom, retainers secured to said upright adjacent the well and overlapping both offset edges of the attachment strip, a retainer secured to said upright adjacent the window opening overlapping one of the offset edges of the attachment strip, whereby the runway member is held to said upright, the retainer adjacent the window opening being separately removable from the window to permit the removal of the runway member from the window.

This specification signed this 17th day of December, 1923.

EDWARD A. WETZEL.